United States Patent
Lu

(10) Patent No.: US 10,628,469 B2
(45) Date of Patent: Apr. 21, 2020

(54) INFORMATION PROCESSING METHOD AND ELECTRONIC DEVICE

(71) Applicant: Lenovo (Beijing) Co., Ltd., Beijing (CN)

(72) Inventor: Jianqiang Lu, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 21 days.

(21) Appl. No.: 15/922,193

(22) Filed: Mar. 15, 2018

(65) Prior Publication Data

US 2018/0285445 A1 Oct. 4, 2018

(30) Foreign Application Priority Data

Apr. 1, 2017 (CN) .......................... 2017 1 0213468

(51) Int. Cl.
| | | |
|---|---|---|
| G10L 15/00 | (2013.01) | |
| G06F 16/332 | (2019.01) | |
| G06F 3/16 | (2006.01) | |
| G06F 16/33 | (2019.01) | |
| G10L 15/22 | (2006.01) | |

(52) U.S. Cl.
CPC .......... *G06F 16/3329* (2019.01); *G06F 3/167* (2013.01); *G06F 16/3343* (2019.01); *G10L 15/22* (2013.01)

(58) Field of Classification Search
CPC .... G10L 15/22; G10L 2015/221; G06F 3/167

USPC .......................................................... 704/275
See application file for complete search history.

(56) References Cited

U.S. PATENT DOCUMENTS

| | | | |
|---|---|---|---|
| 9,805,718 B2 * | 10/2017 | Ayan ................... | H04M 3/4936 |
| 10,026,394 B1 * | 7/2018 | Carbon .................. | G10L 15/22 |
| 2003/0125926 A1 * | 7/2003 | Claassen ............. | G06F 16/3329 |
| | | | 704/1 |
| 2008/0027730 A1 * | 1/2008 | Novack .................. | H04L 12/66 |
| | | | 704/275 |
| 2012/0109759 A1 * | 5/2012 | Oren ...................... | G06Q 30/02 |
| | | | 705/14.72 |

FOREIGN PATENT DOCUMENTS

| | | |
|---|---|---|
| CN | 103686335 A | 3/2014 |
| CN | 104580282 A | 4/2015 |
| CN | 105161097 A | 12/2015 |
| CN | 105319978 A | 2/2016 |
| CN | 105426436 A | 3/2016 |
| CN | 106057205 A | 10/2016 |

* cited by examiner

*Primary Examiner* — Daniel Abebe
(74) *Attorney, Agent, or Firm* — Anova Law Group, PLLC

(57) ABSTRACT

A method for information processing includes collecting input information, obtaining feedback information in response to the input information, and outputting the feedback information. The feedback information contains query sub-information.

18 Claims, 8 Drawing Sheets

INFORMATION PROCESSING METHOD AND ELECTRONIC DEVICE

CROSS-REFERENCE TO RELATED APPLICATION

This application claims priority to Chinese Patent Application No. 201710213468.2, filed on Apr. 1, 2017, the entire contents of which are incorporated herein by reference.

TECHNICAL FIELD

The present disclosure generally relates to the field of artificial intelligence technology and, more particularly, to an information processing method and an electronic device.

BACKGROUND

Artificial intelligence technology is an important branch of computer technology. Convenient services can be provided to users based on artificial intelligence technology. For example, after the user asks about "how is the weather in Beijing tomorrow," an electronic device may output the corresponding weather condition. For those skilled in the art, how to provide users with more comprehensive and accurate services based on artificial intelligence technology is a challenge.

SUMMARY

In one aspect, the present disclosure provides a method for information processing including collecting input information, obtaining feedback information in response to the input information, and outputting the feedback information. The feedback information contains query sub-information.

Another aspect of the present disclosure provides an electronic device including an input circuit, a processor coupled to the input circuit, and an output circuit coupled to the processor. The processor receives input information via the input circuit, obtains feedback information in response to the input information, and sends the feedback information via the output circuit. The feedback information contains query sub-information.

BRIEF DESCRIPTION OF THE FIGURES

The following drawings are merely examples for illustrative purposes according to various disclosed embodiments and are not intended to limit the scope of the present disclosure.

DETAILED DESCRIPTION OF EMBODIMENTS

Embodiments of the disclosure will now be described in more detail with reference to the drawings. It is to be noted that, the following descriptions of some embodiments are presented herein for purposes of illustration and description only, and are not intended to be exhaustive or to limit the scope of the present disclosure.

The aspects and features of the present disclosure can be understood by those skilled in the art through the embodiments of the present disclosure further described in detail with reference to the accompanying drawings.

The present disclosure provides an information processing method and an electronic device. The method and the electronic device provide users with relatively more accurate and comprehensive services by performing continuous communications with users. The electronic device of the disclosure may include, for example, a server or a terminal device, such as a mobile phone, a tablet computer, a smart television, a smart wearable device, or the like.

Figure 1:
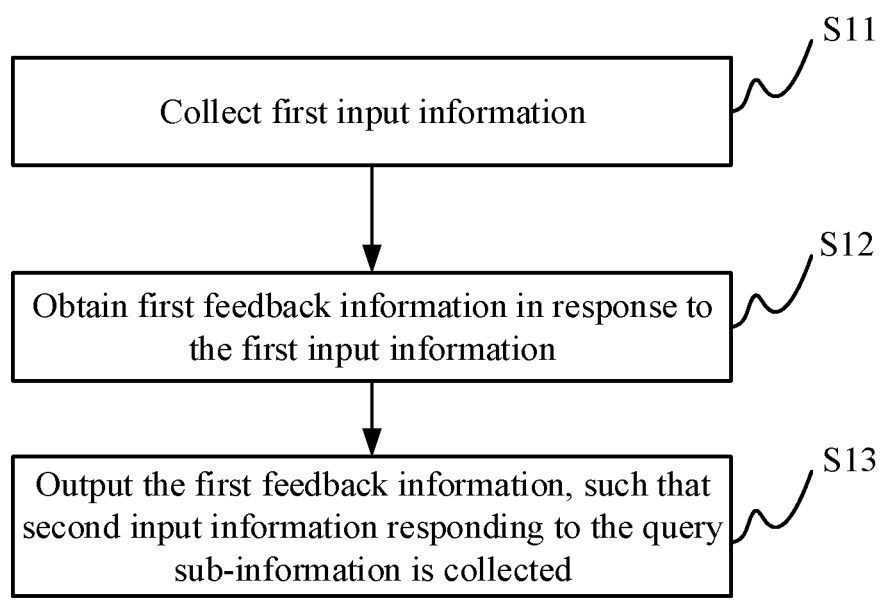
FIG. 1 is a flowchart of an example of information processing method consistent with various disclosed embodiments of the present disclosure.

FIG. 1 is a flowchart of an example of information processing method consistent with disclosed embodiments. With reference to FIG. 1, the method is described below.

At S11, first input information is collected.

The first input information may be generated by the user and may contain information of user need, also referred to as "user need information." In some embodiments, the first input information may include, for example, voice information. In some other embodiments, the first input information may include, for example, text information.

At S12, first feedback information in response to the first input information is obtained, where the first feedback information includes a query sub-information.

The electronic device, in response to the collected first input information, may generate first feedback information. The first feedback information may include the query sub-information. The query sub-information may be used to instruct the user to supplement the user need information, or may be used to prompt the user whether a related service is needed.

In some embodiments, the first feedback information may include the query sub-information. In some other embodiments, the first feedback information may include task result information and the query sub-information.

For example, the first input information may be "check how many tickets are available for train T1 going to Beijing tomorrow." Correspondingly, the first feedback information may include task result information of "50 tickets are available" and the query sub-information of "need to book a ticket?" As another example, if the first input information is "book a movie ticket for movie A of tomorrow afternoon," the first feedback information may include only the query sub-information "which movie theater?"

At S13, the first feedback information is outputted, such that second input information responding to the query sub-information is collected.

The first feedback information outputted by the electronic device may include the query sub-information. After receiving the first feedback information outputted by the electronic device, the user may further supplement the user need information according to the query sub-information, such that the electronic device can provide a more accurate service to the user; or the user may propose a new service request according to the query sub-information, such that the electronic device may provide a corresponding service for the user, so as to provide the user with relatively comprehensive services.

In the information processing method of the disclosure, after first input information is collected, first feedback information may be generated in response to the first input information. The first feedback information may include query sub-information. After the first feedback information is outputted, the user may supplement user need information or may propose a new service request according to the query sub-information, such that the electronic device can provide relatively accurate and comprehensive services to improve user experience.

In some embodiments, when the electronic device is at a detection state, the electronic device may detect whether a wake-up word, e.g., a wake-up voice, is collected. If the wake-up word is collected, the electronic device may activate a recognition state to collect first input information, to respond to the collected first input information, and to output first feedback information. As such, the electronic device may be prevented from staying at the recognition state for a long time and from resulting in a relatively large power consumption.

For example, before the user inputs first input information, the user may need to input a wake-up word "hello, little Q." After detecting the wake-up word, the electronic device may activate a recognition state and may respond to the first input information and generate first feedback information.

In some embodiments, during outputting the first feedback information, the electronic device may switch to the detection state to prevent audio outputted by the electronic device from being collected, and thus to reduce interference.

In some other embodiments, during outputting the first feedback information, the electronic device may remain at the recognition state. In these embodiments, the electronic device may collect user inputs in real time, and thus may timely collect second input information inputted by the user. Further, in order to avoid interference caused by audio outputted by the electronic device, the audio outputted by the electronic device may be filtered out from the collected audio.

After the first feedback information is outputted by the electronic device, the electronic device may automatically stay at the recognition status. Thus, the user may not need to input the wake-up word again before inputting the second input information.

In some embodiments, the electronic device may switch back to the detection state, if it is determined that no feedback information is to be outputted again; or may switch back to the detection state, if the electronic device outputs the feedback information but receives no user input.

In some embodiments, a detection of a wake-up word and processing of first input information may be performed on a terminal device or a server. In some other embodiments, a detection of a wake-up word may be performed on a terminal device, and processing of first input information may be performed on a server.

Figure 2:
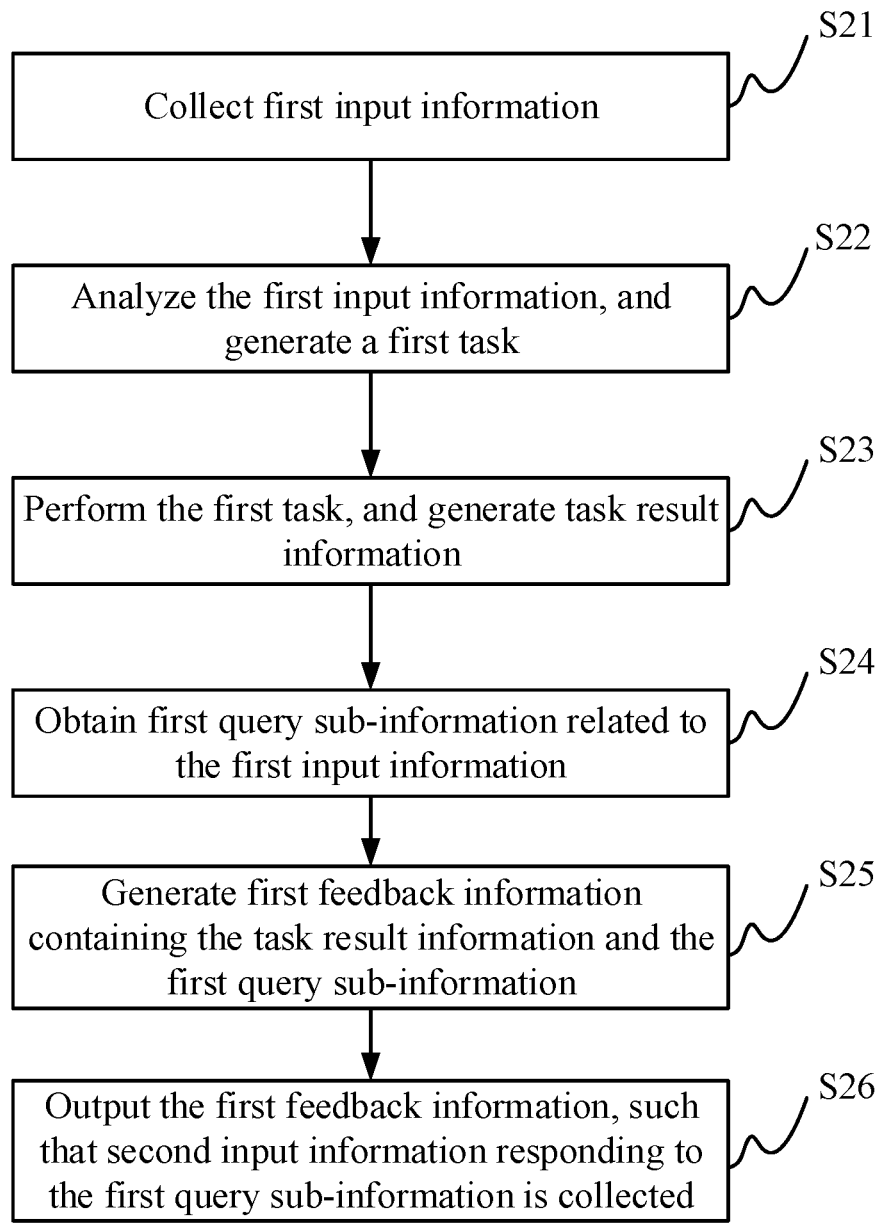
FIG. 2 is a flowchart of another example of information processing method consistent with various disclosed embodiments of the present disclosure.

FIG. 2 is a flowchart of another example of information processing method consistent with disclosed embodiments. With reference to FIG. 2, the method is described below.

At S21, first input information is collected.

At S22, the first input information is analyzed, and a first task is generated.

At S23, the first task is performed, and task result information is generated.

The first input information may be analyzed, and target data needed for generating a task may be determined. The target data may be used to generate the task, and the task may be considered or taken as the first task. The electronic device may perform the first task and may generate the task result information.

For example, the first input information may be "how is the weather in Beijing tomorrow?" By analyzing the first input information, target data needed for generating a task may be determined, and the target data may include an event element of "weather query," a location element of "Beijing," and a time element of "Oct. 2, 2016" (assuming the current time is Oct. 1, 2016). The target data may be used to generate a task of querying weather in Beijing on Oct. 2, 2016. The electronic device may perform the task to obtain weather information of Beijing on Oct. 2, 2016, and the weather information may be considered as the task result information.

At S24, first query sub-information related to the first input information is obtained.

In addition to performing the task and generating the task result information, the electronic device may obtain first query sub-information related to the first input information. The first query sub-information may be used for prompting whether the user needs other service(s) related to the service requested by the first input information.

Still taking the first input information of "how is the weather in Beijing tomorrow" as an example, if the user is located in a place other than Beijing, the first query sub-information may be "need to book a flight to Beijing?" If the user is located in Beijing and the weather information indicates a sunny day, the first query sub-information may be "go to a certain scenic spot?"

At S25, first feedback information containing the task result information and the first query sub-information is generated.

At S26, the first feedback information is outputted, such that second input information responding to the first query sub-information is collected.

The first feedback information outputted by the electronic device may include the task result information and the first query sub-information. The user can learn an execution result of the first input information, and the user can also learn a prompt of whether the related service is needed. If the user needs the related service, the second input information may be inputted, such that the electronic device may provide the related service.

In the information processing method of the disclosure, such as the information processing method described in connection with FIG. 2, the electronic device may respond to collected first input information, may generate a first task, may perform the first task, and may generate task result information. The electronic device may further generate first query sub-information related to the first input information, and the first query sub-information may prompt whether the user needs other service(s) related to the service requested by the first input information. Further, the electronic device may generate first feedback information that includes the task result information and the first query sub-information, and may output the first feedback information. Based on the information processing method, the electronic device not only may respond to the first input information inputted by the user and provide the user with a corresponding service, but also may prompt the user whether the related service is needed, thereby providing the user with relatively comprehensive services.

Various approaches can be used to obtain the first query sub-information related to the first input information at process S24, such as approaches described below.

One approach may include extracting a keyword and obtaining the first query sub-information according to the extracted keyword.

In some embodiments, a keyword included in the first input information or the task result information may be extracted, and the first query sub-information may be obtained according to the extracted keyword.

The first input information may indicate a service that the user needs from the electronic device, and the first query sub-information may be obtained according to a keyword in the first input information. In addition, after learning the task result information, the user may propose a new service request according to the task result information. Thus, the first query sub-information may be obtained according to a keyword in the task result information.

In some embodiments, the keyword in the first input information may be extracted, and the first query sub-information that matches the keyword in the first input information may be obtained.

In some embodiments, a correspondence between keywords and query key information may be preset. After the keyword in the first input information is extracted, corresponding query key information may be obtained according to the correspondence, and the first query sub-information may be generated according to the query key information.

The correspondence between the keywords and the query key information may be generated through trainings.

In some embodiments, the trainings may be performed according to data associated with the user to determine the correspondence between the keywords and the query key information, or may be performed in a background according to data associated with a plurality of users to determine the correspondence between the keywords and the query key information.

Further, if one keyword corresponds to a large amount of query key information, selection may be made according to a preset strategy.

If a large amount of query key information corresponding to one keyword includes first query key information generated based on trainings according to the data associated with the user and second query key information generated based on trainings according to data associated with a plurality of users, the first query key information may be selected, and the first query sub-information may be generated according to the first query key information.

If a large amount of query key information corresponding to one keyword are generated based on trainings according to data associated with a plurality of users, corresponding query key information may be selected according to attribute information of the user, e.g., a gender of the user, an age of the user, and/or a place where the user is located, and the first query sub-information may be generated according to the query key information.

For example, after the user inquiries about restaurant information, if relatively more subsequent requests include ordering a meal, a correspondence between a keyword "restaurant" and query key information "order a meal" can be established. As another example, after the user inquiries about the ticket information, if relatively more subsequent requests include a request for booking a ticket, a correspondence between a keyword "ticket" and query key information "booking a ticket" can be established.

How to obtain the first query sub-information that matches the keyword(s) in the first input information is not limited to the above-described examples, and may be chosen according to various application scenarios. For example, a correspondence between keywords and query sub-information is established based on trainings. After a keyword in the first input information is extracted, first query sub-information that matches the keyword may be obtained according to the correspondence.

In some embodiments, the trainings may be performed according to the data associated with the user to determine the correspondence between the keywords and the query sub-information, or may be performed in a background according to data associated with a plurality of users to determine the correspondence between the keywords and the query sub-information.

In some other embodiments, a keyword in the task result information may be extracted, and first query sub-information matching the keyword in the task result information may be obtained.

In some embodiments, a correspondence between keywords and the query key information may be preset. After a keyword in the task result information is extracted, corresponding query key information may be obtained according to the correspondence, and the first query sub-information may be generated according to the obtained query key information.

The correspondence between the keywords and the query key information may be generated through trainings. In some embodiments, the trainings may be performed according to the data associated with the user to determine the correspondence between the keywords and the query key information, or may be performed in background according to data associated with a plurality of users to determine the correspondence between the keywords and the query key information.

For example, after the user asks about weather information, the weather information returned by the electronic device may be a sunny day. If there are relatively more subsequent requests for inquiring about leisure places, a correspondence between the keyword "sunny day" and the query key information "leisure places" may be established.

As another example, after the user inquiries about a recipe, the electronic device may return recipe information including ingredients and a detailed cooking procedure. If there are relatively more subsequent requests for purchasing the ingredients, a correspondence between the keyword "ingredients" and query key information "purchase items" may be established.

In some embodiments, if the generated task result information includes at least one purchasable item, the first query sub-information generated according to the query key information "purchase item" may include "whether to purchase XX item." If second input information that indicates agreeing to purchase the item is collected, a request to purchase the item may be sent to a corresponding shopping server. That is, an order may be placed with the shopping server.

Determining whether the item can be purchased may include checking on the shopping server whether there is sales information of the item.

How to obtain the first query sub-information that matches the keyword(s) in the task result information is not limited to the above-described examples, and may be chosen according to various application scenarios. For example, a correspondence between keywords and query sub-information is established based on trainings. After a keyword in the task result information is extracted, the first query sub-information that matches the keyword may be obtained according to the correspondence.

In the present disclosure, the term "keyword of first input information" or a similar expression may include one or more words appearing in the first input information, or may include one or more keywords corresponding to the one or more words appearing in the first input information. For example, the first input information may include a word "restaurant," "dining hall," or "private home cuisine," then "restaurant" can be configured as a keyword corresponding to these words.

Another approach may include determining an intention of the user and obtaining the first query sub-information according to the intention of the user.

In some embodiments, the intention of the user may be determined according to the first input information or the task result information, and the first query sub-information may be obtained according to the intention of the user. A user may often need to know some relevant information before making a final decision, and make the final decision according to the relevant information. Thus, the intention of the user may be determined according to the first input information inputted by the user or the task result information generated by the electronic device, and the first query sub-information may be obtained according to the intention of the user.

For example, a user may often need to know tourist spots of a new place before going to the new place. If the first input information includes enquiry about tourist spots of a new place, it may be determined that the intention of the user is to visit the new place. Thus, the first query sub-information may be generated to prompt whether there is a need to purchase a ticket, e.g., a ticket for a train, a bus, or a flight, to visit the new place.

As another example, before a user visits a restaurant, the user may often need to know a consumer's rating on the restaurant. If the first input information includes enquiry about the restaurant's rating and the task result information indicates that the restaurant is relatively well rated, it may be determined that the intention of the user is to visit the restaurant. Thus, the first query sub-information may be generated to prompt whether to pre-order.

In some embodiments, the first query sub-information having a relevance to the first input information that satisfies a preset requirement may be obtained.

In some embodiments, query sub-information that has a relevance to input information may be preset. Query sub-information having a relevance to the first input information that satisfies a preset requirement may be searched for, and the located query sub-information may be taken as the first query sub-information. The query sub-information having a relevance to the input information may be generated by trainings.

In some other embodiments, the first query sub-information having a relevance to the task result information that satisfies a preset requirement may be obtained.

In some embodiments, query sub-information that has a relevance to the task result information may be preset. Query sub-information having a relevance to the task result information that satisfies a preset requirement may be searched for, and the located query sub-information may be taken as the first query sub-information. The query sub-information having a relevance to the task result information may be generated by trainings.

Another approach may include obtaining the first query sub-information according to the first input information.

In some embodiments, an intention of the user may be determined according to the first input information, and the first query sub-information may be obtained according to the intention of the user. In some other embodiments, the first query sub-information may be obtained according to a keyword of the first input information.

In some embodiments, the first query sub-information having a relevance to the first input information that satisfies a preset requirement may be obtained. In some other embodiments, a keyword in the first input information may be extracted, and the first query sub-information that matches the keyword in the first input information may be obtained. Details may be referenced to above descriptions.

Another approach may include obtaining first query sub-information according to the task result information.

In some embodiments, an intention of the user may be determined according to the task result information, and the first query sub-information may be obtained according to the intention of the user. In some other embodiments, the first query sub-information may be obtained according to a keyword of the task result information.

In some embodiments, the first query sub-information having a relevance to the task result information that satisfies a preset requirement may be obtained. In some other embodiments, a keyword in the task result information may be extracted, and first query sub-information matching the keyword in the task result information may be obtained. Details may be referenced to above descriptions.

Figure 3:
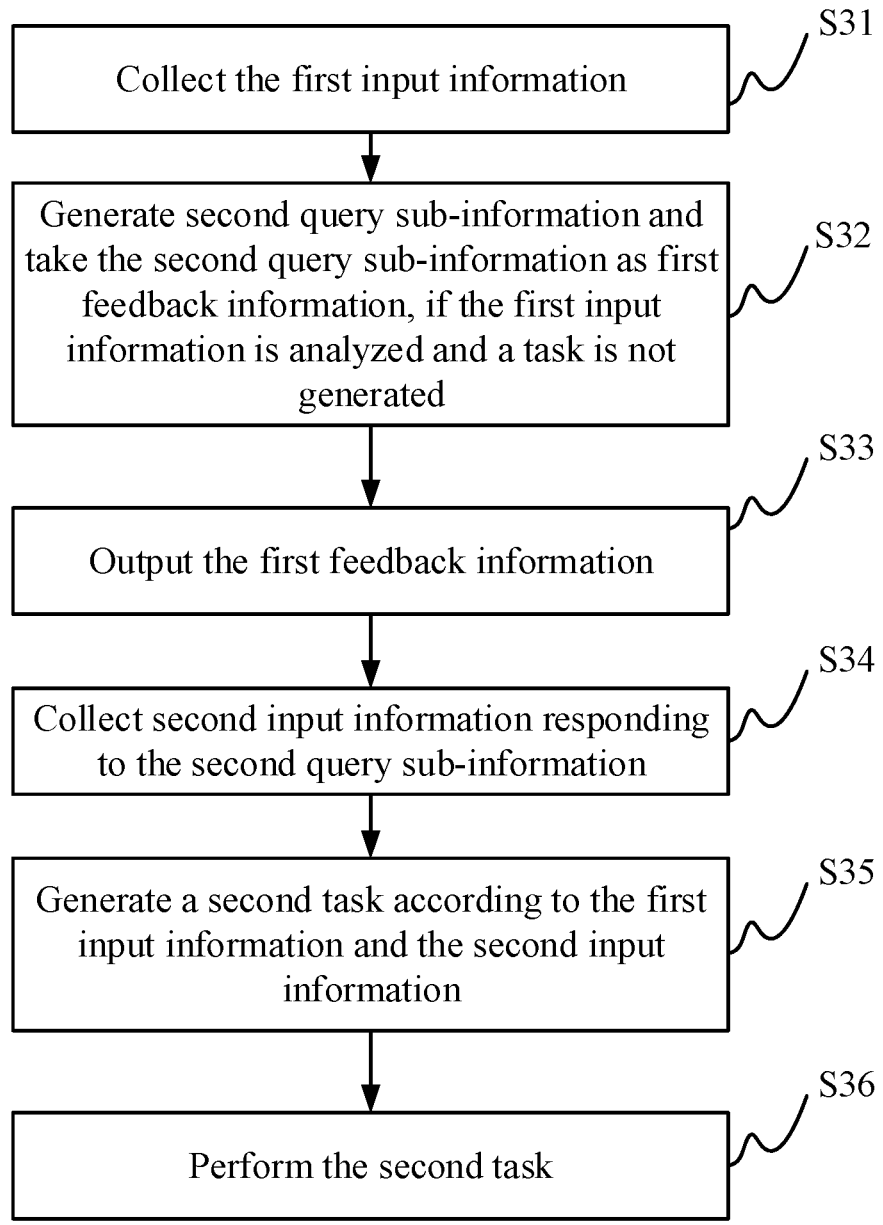
FIG. 3 is a flowchart of another example of information processing method consistent with various disclosed embodiments of the present disclosure.

FIG. 3 is a flowchart of another example of information processing method consistent with disclosed embodiments. With reference to FIG. 3, the method is described below.

At S31, the first input information is collected.

At S32, if the first input information is analyzed and a task is not generated, e.g., if the first input information is insufficient for generating a task, second query sub-information is generated and is taken as first feedback information. The second query sub-information may instruct the user to provide target data needed for generating a task.

If the first input information does not contain enough target data needed for generating the task or target data for determining a certain task element in the first input information is inaccurate, the task cannot be accurately generated. In this case, second query sub-information may be generated, and the second query sub-information may instruct the user to provide the target data needed for generating the task. A task element may refer to one of element(s) for forming a task, such as a time element, an event element, or a location element.

At S33, the first feedback information is outputted.

At S34, second input information responding to the second query sub-information is collected.

At S35, a second task is generated according to the first input information and the second input information.

At S36, the second task is performed.

The user may obtain the first feedback information outputted by the electronic device, and may input the second input information according to a prompt of the second query sub-information. The second input information may include the target data needed for generating the task that is not contained or not completely contained in the first input information or that is inaccurate in the first input information. The electronic device may obtain entire target data needed for generating the task according to the first input information and the second input information, may generate the second task according to the entire target data, and may perform the second task.

In the information processing method of the disclosure, such as the information processing method described in connection with FIG. 3, if the first input information inputted by the user has a problem in that the target data is missing or is not complete, or the target data is not accurate enough, the second query sub-information may be generated. The second query sub-information may instruct a user to provide target data needed for generating a task. The second query sub-information may be outputted as the first feedback information, such that the user may input the second input information in response to the second query sub-information. Further, the electronic device may generate a second task according to the first input information and the second input information, and may perform the second task. Because the target data needed for generating the second task has been complemented or confirmed by the second input information, the electronic device can generate a more accurate task and thus provide the user with a more accurate service.

Various reasons, such as two reasons described below, may cause a failure of generating a task according to the first input information.

One reason may be that, the first input information may not contain entire target data needed for generating the task. Task elements that form a task may generally contain a plurality of elements, such as a time element, an event element, and a location element. If target data for determining a task element is lacking, the task may not be generated. For example, task elements contained in a request to purchase a movie ticket may include a date, a location, a movie title, and a movie session. If the first input information does not contain target data needed for determining one or more of the above-described task elements, an accurate task cannot be generated.

Another reason may be that, target data for determining a certain task element in the first input information is inaccurate, which may also lead to inability to generate an accurate task. For example, for a task of navigating to restaurant A, where A represents a name of the restaurant, the first input information may contain target data of "restaurant A." However, there may be a plurality of restaurants A in the city where the user is located, the location element in the task may be inaccurate and an accurate task cannot be generated.

In some application scenarios, the electronic device may generate a second query sub-information by generating second query sub-information prompting the user to input target data that the first input information lacks.

After the user obtains first feedback information from the electronic device, the user may input second input information under the prompt of the second query sub-information, and the second input information may at least include target data that is missing in the first input information. That is, the target data that is missing in the first input information may be supplemented by the second input information, and the electronic device can accurately generate a second task according to the complete target data contained in the first input information and the second input information.

Figure 4:
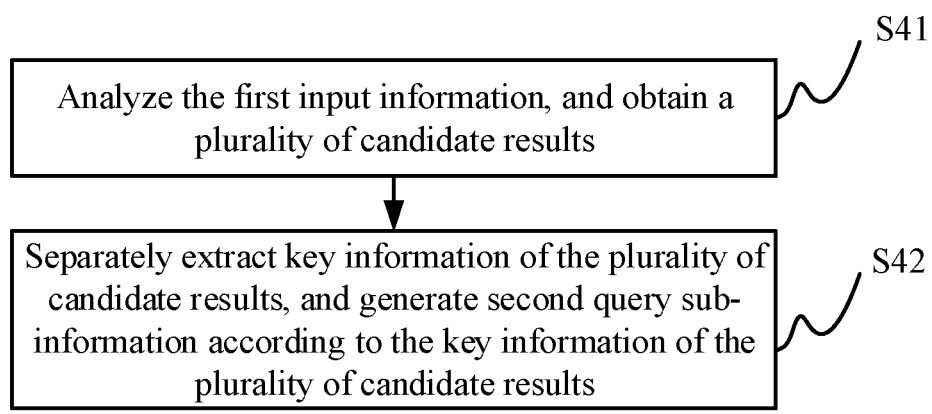
FIG. 4 is a flowchart of an example of method for generating second query sub-information consistent with various disclosed embodiments of the present disclosure.

Some other application scenarios are described below with reference to FIG. 4. FIG. 4 is a flowchart of an example of method for generating second query sub-information consistent with disclosed embodiments. The method is described below.

At S41, the first input information is analyzed, and a plurality of candidate results are obtained.

The candidate results may include all or some of the task elements.

For example, the first input information may be "navigate to restaurant A," and the city where the user is located may have 3 restaurants A, i.e., restaurant A at Number X1 Avenue C1 District B1, restaurant A at Number X2 Road C2 District B1, and restaurant A at Number X3 Avenue C3 District B2.

In one processing approach, the plurality of candidate results may include event elements and location elements, and the plurality of candidate results may include navigating to restaurant A at Number X1 Avenue C1 District B1, navigating to restaurant A at Number X2 Road C2 District B1, and navigating to restaurant A at Number X3 Avenue C3 District B2.

In another processing approach, the plurality of candidate results may include only undetermined location elements of the task, and the plurality of candidate results may include restaurant A at Number X1 Avenue C1 District B1, restaurant A at Number X2 Road C2 District B1, and restaurant A at Number X3 Avenue C3 District B2.

At S42, key information of the plurality of candidate results are extracted, respectively, and second query sub-information is generated according to the key information of the plurality of candidate results. The key information of the plurality of candidate results may be different, and key information of each candidate result may include a portion of information contained in the candidate result.

After the plurality of candidate results are obtained, key information of the plurality of candidate results may be respectively extracted. The key information of each candidate result may include a portion of information contained in the candidate result, and the key information of the plurality of candidate results may be different. Accordingly, the number of characters contained in the second query sub-information may be reduced.

In some embodiments, key information of the plurality of candidate results may be different, and key information of each candidate result may include a portion of information contained in the candidate result, and may have a complete semantic meaning.

For example, the key information of the three candidate results in the above-described example may include Number X1 Avenue C1 District B1, Number X2 Road C2 District B1, and Number X3 Avenue C3 District B2.

In some embodiments, the plurality of candidate results may also be analyzed to determine key information of each candidate result, such that the key information of the candidate result may have a complete semantic meaning and a minimized number of characters. Further, the plurality of candidate results can be distinguished according to the key information of each candidate result. Accordingly, the user can complete the selection and input the second input information in a short time.

For example, the key information of the three candidate results in the above-described example may include Avenue C1 District B1, Road C2 District B1, and District B2.

Various approaches may be adopted to generate the second query sub-information according to extracted key information of the candidate results, as described below.

In one approach, generating the second query sub-information according to the extracted key information of the plurality of candidate results may include arranging the key information of the plurality of candidate results in sequence, and forming the second query sub-information.

In another approach, generating the second query sub-information according to the extracted key information of the plurality of candidate results may include arranging the key information of the plurality of candidate results in sequence, and adding identifiers to the key information of the candidate results, respectively, to form the second query sub-information.

In some embodiments, outputting the first feedback information may include displaying an image including the first feedback information through a display screen. In some other embodiments, outputting the first feedback information may include converting the first feedback information into voice information and playing the voice information.

Various approaches may be used to implement process S35 of the information processing method described in connection with FIG. 3.

In one approach, generating the second task according to the first input information and the second input information may include extracting a keyword contained in the second input information; matching the keyword contained in the second input information with the key information of the plurality of candidate results respectively, and determining a candidate result having the highest matching degree with the keyword among the plurality of candidate results; and generating the second task according to the candidate result having the highest matching degree.

Still taking one of the above-described examples for description, the second input information may include "of District B2," and the keyword "District B2" in the second input information may be extracted. The keyword "District B2" may have the highest matching degree with the key information "Number X3 Avenue C3 District B2." It may be determined that the candidate result "restaurant A at Number X3 Avenue C3 District B2" has the highest matching degree. A task of "navigating to restaurant A at Number X3 Avenue C3 District B2" may be generated according to the candidate result.

In another approach, generating the second task according to the first input information and the second input information may include extracting a sequence keyword contained in the second input information; determining a candidate result indicated by the sequence keyword among the plurality of candidate results, and generating the second task according to the candidate result indicated by the sequence keyword.

Still taking one of the above-described examples for description, the second input information may include "the second restaurant," and the sequence keyword "second" contained in the second input information may be extracted. If the candidate result located in the second place among the plurality of candidate results is "restaurant A at Number X2 Road C2 District B1," a task of "navigating to restaurant A at Number X2 Road C2 District B1" may be generated according to the candidate result.

In another approach, generating the second task according to the first input information and the second input information may include determining a first time point at which the second input information is collected during playing of the voice information; determining a candidate result corresponding to the first time point among the plurality of candidate results; and generating the second task according to the candidate result corresponding to the first time point.

During the playing of the voice, when the second input information is collected, it may indicate that the user has made selection on the key information of the plurality of candidate results. The corresponding candidate result may be determined according to the time point at which the second input information is collected, and the second task may be generated according to the candidate result. In some embodiments, the second input information may include "this is it" or a similar expression for a confirmation.

Given that it may take a certain amount of time for the user to hear the voice information, make a judgment, and input the second input information, in some embodiments, a second time point may be determined based on the first time point and a predetermined time duration, e.g., 0.5 seconds. For example, the second time point may be determined by pushing the first time point forward by the predetermined time duration, i.e., the second time point may be a time point that is earlier than the first time point by the predetermined time duration. Key information being played at the second time point may be determined, and the candidate result corresponding to the key information may be taken as a final candidate result for generating the second task.

Figure 5:
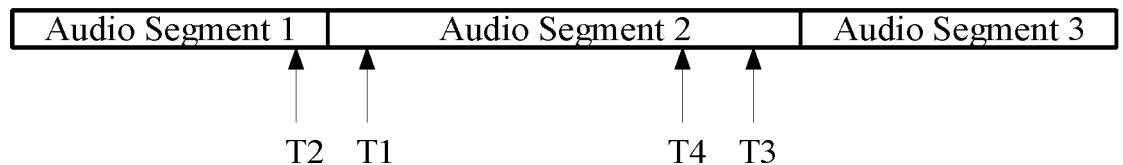
FIG. 5 is a schematic diagram of determining a candidate result according to a first time point consistent with various disclosed embodiments of the present disclosure.

Referring to FIG. 5, the voice information includes an audio segment 1 corresponding to key information 1, an audio segment 2 corresponding to key information 2, and an audio segment 3 corresponding to key information 3. The key information 1 may include key information of candidate result 1, the key information 2 may include key information of candidate result 2, and the key information 3 may include key information of candidate result 3.

If a time point at which the electronic device collects the second input information is T1, the time point T1 may be pushed forward by a predetermined time duration to obtain a time point T2, at which the audio segment 1 corresponding to the key information 1 is being played. Thus, the candidate result 1 may be taken as a final candidate result for generating the second task. If a time point at which the electronic device collects the second input information is T3, the time point T3 may be pushed forward by a predetermined time duration to obtain a time point T4, at which the audio segment 2 corresponding to the key information 2 is being played. Thus, the candidate result 2 may be taken as a final candidate result for generating a second task.

In some other embodiments, key information that is being played at the first time point and a progress of the key information that has been played by the first time point may be determined. If the progress of the key information that has been played by the first time point reaches a first threshold, e.g., approximately 50% of the audio segment, a candidate result corresponding to the key information being played at the first time point may be taken as a final candidate result for generating the second task. If the progress of the key information that has been played by the first time point does not reach the first threshold, a candidate result corresponding to key information preceding the key information being played at the first time point may be taken as a final candidate result for generating the second task.

Figure 6:
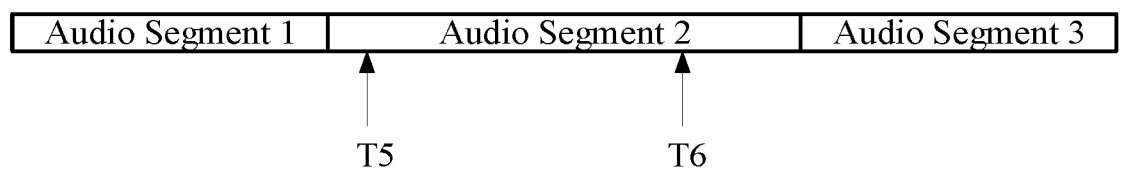
FIG. 6 is another schematic diagram of determining a candidate result according to a first time point consistent with various disclosed embodiments of the present disclosure.

Referring to FIG. 6, the voice information includes an audio segment 1 corresponding to key information 1, an audio segment 2 corresponding to key information 2, and an audio segment 3 corresponding to key information 3. The key information 1 may include key information of candidate result 1, the key information 2 may include key information of candidate result 2, and the key information 3 may include key information of candidate result 3.

If a time point at which the electronic device collects the second input information is a time point T5, and the audio segment 2 corresponding to the key information 2 is currently being played, and a progress of the audio segment 2 that has been played by the time point T5 (the portion of the audio segment 2 to the left of the time point T5 in FIG. 6) does not reach the first threshold, then the candidate result 1 may be taken as a final candidate result for generating the second task. If a time point at which the electronic device collects the second input information is a time point T6, and the audio segment 2 corresponding to the key information 2 is currently being played, and a progress of the audio segment 2 that has been played by the time T6 (the portion of the audio segment 2 to the left of the time point T6 in FIG. 6) reaches the first threshold, then the candidate result 2 may be taken as a final candidate result for generating the second task.

In some embodiments, the information processing method of the disclosure may be implemented in, for example, a server. In some other embodiments, the information processing method of the disclosure may be implemented in, for example, a terminal device such as a mobile phone, a tablet computer, a smart television, or a smart wearable device. In the embodiments that the information processing method is implemented in a terminal device, the terminal device may execute all of the above-describe processes, or may receive data fed back from a server to implement a complete function. For example, the first feedback information may be generated by the server and sent to the terminal device.

The present disclosure also provides an information processing apparatus. For descriptions of the information processing apparatus described below and above descriptions of the information processing method, reference can be made to each other.

Figure 7:
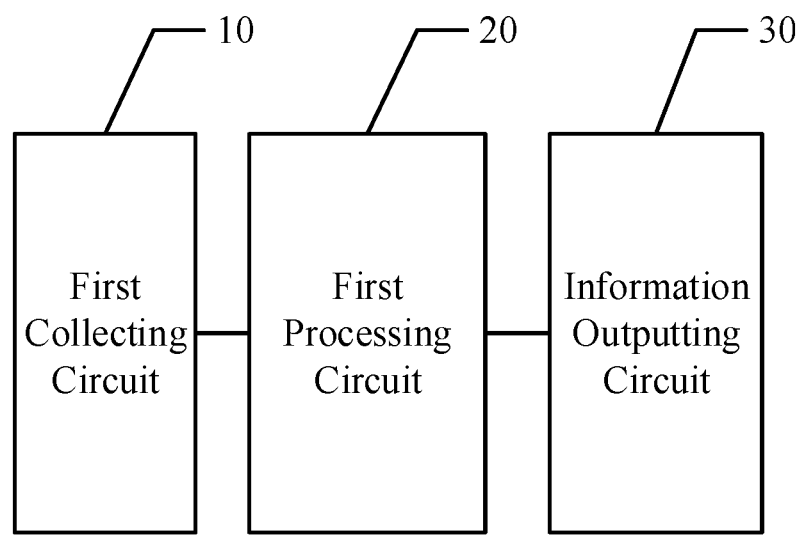
FIG. 7 is a block diagram of an example of information processing apparatus consistent with various disclosed embodiments of the present disclosure.

FIG. 7 is a block diagram of an example of information processing apparatus consistent with the disclosure. The information processing apparatus includes a first collecting circuit 10, a first processing circuit 20, and an information outputting circuit 30.

The first collecting circuit 10 is configured to collect first input information.

The first processing circuit 20 is configured to obtain first feedback information responding to the first input information, where the first feedback information includes query sub-information.

The information outputting circuit 30 is configured to output the first feedback information, such that second input information responding to the query sub-information can be collected.

In the information processing apparatus of the disclosure, after the first input information is collected, first feedback information may be generated in response to the first input information. The first feedback information may include query sub-information. After the first feedback information is outputted, the user may further supplement user need information, or may propose a new service request according to the query sub-information, such that the information processing apparatus can provide the user with more accurate and comprehensive services to enhance a user experience.

In some embodiments, the information outputting circuit 30 may output the first feedback information by displaying an image containing the first feedback information through a display screen, or by converting the first feedback information into voice information and playing the voice information.

Figure 8:
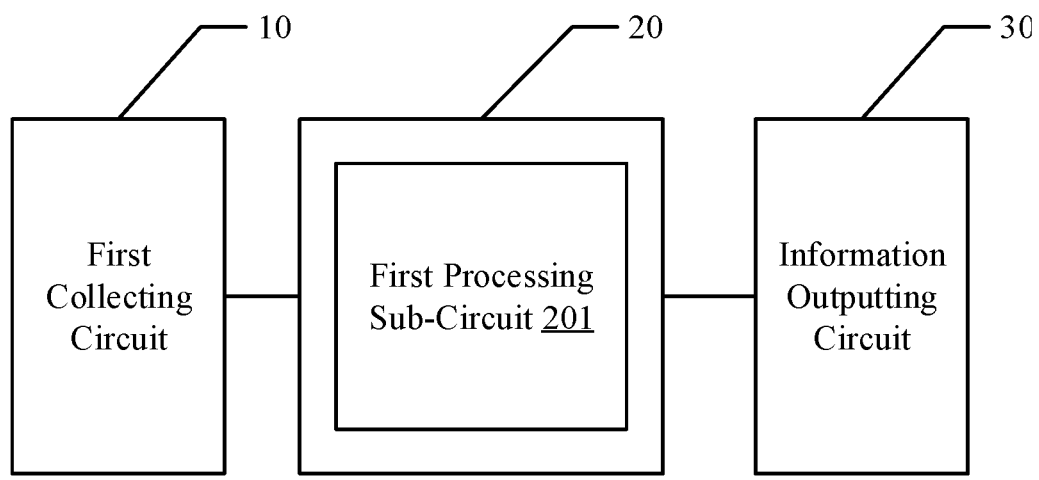
FIG. 8 is a block diagram of another example of information processing apparatus consistent with various disclosed embodiments of the present disclosure.

FIG. 8 is a block diagram of another example of information processing apparatus consistent with disclosure embodiments. The information processing apparatus includes the first collecting circuit 10, the first processing circuit 20, and the information outputting circuit 30.

The first collecting circuit 10 is configured to collect first input information.

The first processing circuit 20 is configured to obtain first feedback information responding to the first input information, where the first feedback information includes query sub-information. Further, as shown in FIG. 8, the processing circuit 20 includes a first processing sub-circuit 201.

The first processing sub-circuit 201 is configured to analyze the first input information and generate a first task; to perform the first task and generate task result information; to obtain first query sub-information related to the first input information; and to generate first feedback information containing the task result information and the first query sub-information.

The information processing apparatus in FIG. 8 of the present disclosure may generate a first task in response to collected first input information, perform the first task, generate task result information, and generate first query sub-information related to the first input information. The first query sub-information may be used for prompting the user whether other service(s) related to the service requested by the first input information is needed. The information processing apparatus may further generate first feedback information containing the task result information and the first query sub-information, and may output the first feedback information. The information processing apparatus not only may response to the first input information inputted by the user to provide the user with a corresponding service, but also may prompt the user whether related service(s) is needed, thereby providing the user with relatively comprehensive services.

In some embodiments, the first processing sub-circuit 201 may obtain the first query sub-information related to the first input information by obtaining first query sub-information having a relevance to the first input information that satisfies a preset requirement or by extracting a keyword in the first input information and obtaining first query sub-information that matches the keyword in the first input information.

In some embodiments, the first processing sub-circuit 201 may obtain the first query sub-information related to the first input information by extracting a keyword in the task result information and obtaining the first query sub-information that matches the keyword in the task result information.

Figure 9:
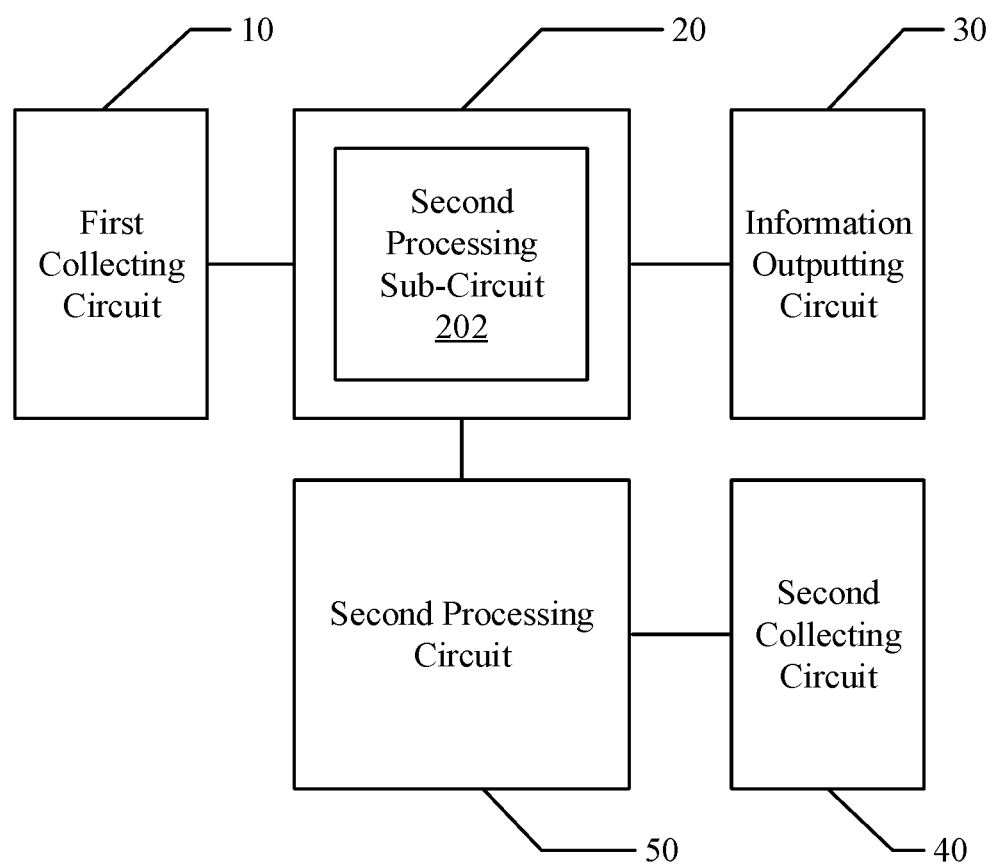
FIG. 9 is a block diagram of another example of information processing apparatus consistent with various disclosed embodiments of the present disclosure.

FIG. 9 is a block diagram of another example of information processing apparatus consistent with disclosed embodiments. The information processing apparatus includes the first collecting circuit 10, the first processing circuit 20, the information outputting circuit 30, a second collecting circuit 40, and a second processing circuit 50.

The first collecting circuit 10 is configured to collect first input information.

The first processing circuit 20 is configured to obtain first feedback information responding to the first input information, where the first feedback information includes query sub-information. Further, as shown in FIG. 9, the processing circuit 20 includes a second processing sub-circuit 202.

The second processing sub-circuit 202 is configured to generate second query sub-information if a task cannot be generated based on analysis on the first input information, where the second query sub-information instructs the user to provide target data needed for generating the task; and to take the second query sub-information as first feedback information.

The information outputting circuit 30 is configured to output the first feedback information, such that second input information responding to the query sub-information can be collected.

The second collecting circuit 40 is configured to collect the second input information responding to the second query sub-information.

The second processing circuit 50 is configured to generate a second task according to the first input information and the second input information and perform the second task.

The information processing apparatus described in connection with FIG. 9 may generate second query sub-information, if the first input information inputted by the user has a problem in that target data is missing or incomplete, or target data is not accurate enough. The second query sub-information may instruct the user to provide the target data needed for generating the task. The information processing apparatus may output the second query sub-information as the first feedback information, such that the user may input the second input information in response to the second query sub-information. The information processing apparatus may further generate a second task according to the first input information and the second input information, and may perform the second task. Because the target data needed for generating the second task has been complemented or confirmed by the second input information, a more accurate task can be generated to provide the user with a more accurate service.

In some embodiments, the second processing sub-circuit 202 may generate the second query sub-information by analyzing the first input information and obtaining a plurality of candidate results, where the candidate results may include all or some of the task elements; and by extracting key information of the plurality of candidate results respectively and generating second query sub-information according to the extracted key information of the plurality of candidate results. The key information of the plurality of candidate results may be different, and key information of each candidate result may include a portion of information contained in the candidate result.

In some embodiments, the second processing sub-circuit 202 may generate the second query sub-information according to the extracted key information of the plurality of candidate results, by arranging the key information of the plurality of candidate results in sequence and forming the second query sub-information.

In some embodiments, the second processing sub-circuit 202 may generate the second query sub-information according to the extracted key information of the plurality of candidate results, by arranging the key information of the plurality of candidate results in sequence, and adding identifiers to the key information of the candidate results respectively to form the second query sub-information.

In some embodiments, the second processing circuit 50 may generate the second task according to the first input information and the second input information by extracting a keyword contained in the second input information; respectively matching the keyword contained in the second input information with the key information of the plurality of candidate results to determine a candidate result having the highest matching degree with the keyword contained in the second input information among the plurality of candidate results, and generating the second task according to the candidate result having the highest matching degree.

In some embodiments, the second processing circuit 50 may generate the second task according to the first input information and the second input information by extracting a sequence keyword contained in the second input information; determining a candidate result indicated by the sequence keyword among the plurality of candidate results, and generating a second task according to the candidate result indicated by the sequence keyword.

In some embodiments, the second processing circuit 50 may generate the second task according to the first input information and the second input information by determining a first time point at which second input information is collected during playing of the voice information, determining a candidate result corresponding to the first time point among the plurality of candidate results, and generating a second task according to the candidate result corresponding to the first time point.

Figure 10:
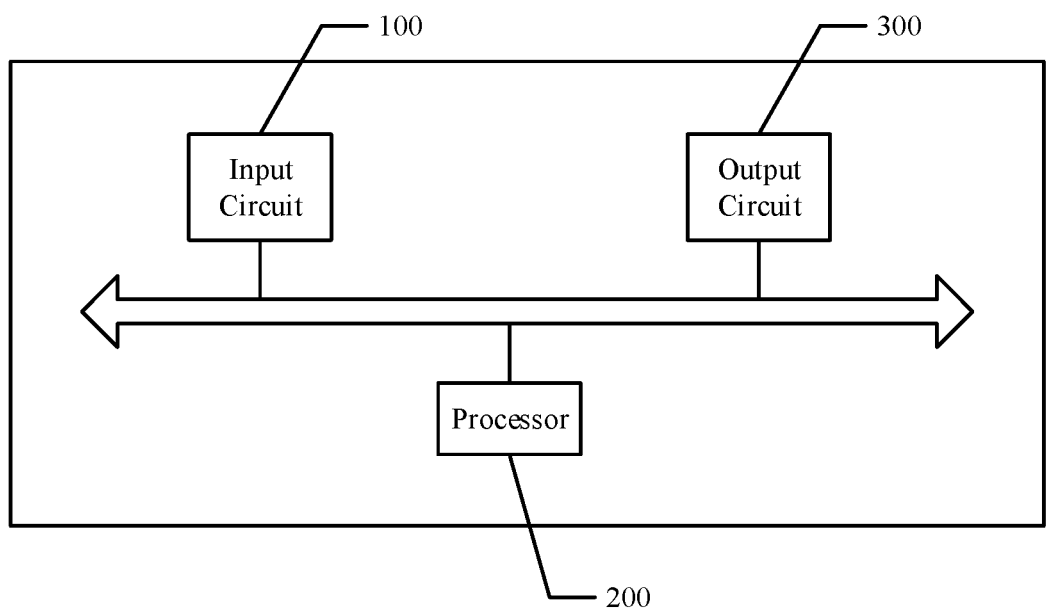
FIG. 10 is a block diagram of an example of electronic device consistent with various disclosed embodiments of the present disclosure.

Another aspect of the present disclosure provides an electronic device. The electronic device may include, for example, a server or a terminal device. The terminal device may include, for example, a mobile phone, a tablet computer, a smart television, or a smart wearable device. FIG. 10 is a block diagram of an example of electronic device consistent with disclosed embodiments. As shown in FIG. 10, The electric device includes an input circuit 100, a processor 200, and an output circuit 300.

The input circuit 100 is configured to collect first input information.

The processor 200 is configured to receive the first input information via the input circuit and respond to the first input information to obtain first feedback information, where the first feedback information includes query sub-information.

The output circuit 300 is configured to output the first feedback information, such that the input circuit 100 can collect second input information responding to the query sub-information. That is, the processor 200 can send the first feedback information via the output circuit 300.

The electronic device of the disclosure may generate first feedback information in response to first input information, after the first input information is collected. The first feedback information may include query sub-information. After the first feedback information is outputted, the user may further supplement user need information or may propose a new service request according to the query sub-information, such that the electronic device can provide the user with more accurate and comprehensive services to enhance user experience.

The electronic device may include, for example, a terminal device. In some embodiments, the output circuit 300 may include, for example, a display screen, and an image containing the first feedback information may be displayed on the display screen. In some other embodiments, the output circuit 300 may include, for example, an audio playing apparatus, the processor 200 may convert the first feedback information into voice information, and the audio playing apparatus may play the voice information.

In the embodiments that the electronic device includes a server as an example, the input circuit 100 and the output circuit 300 may include communication interfaces.

In some embodiments, the processor 200 may be configured to respond to the first input information and obtain the first feedback information by: analyzing the first input information and generating a first task; performing the first task and generating task result information; obtaining first query sub-information related to the first input information; and generating first feedback information containing the task result information and the first query sub-information.

In some embodiments, the processor 200 may be configured to obtain the first query sub-information related to the first input information by extracting a keyword and obtaining the first query sub-information according to the extracted keyword; or by determining an intention of the user, and obtaining the first query sub-information according to the intention of the user; or by obtaining first query sub-information according to the first input information; or by obtaining the first query sub-information according to the task result information.

In some embodiments, the processor 200 may be configured to obtain the first query sub-information related to the first input information by obtaining first query sub-information having a relevance to the first input information that satisfies a preset requirement.

In some embodiments, the processor 200 may be configured to obtain the first query sub-information related to the first input information by extracting a keyword in the first input information and obtaining first query sub-information that matches the keyword in the first input information.

In some embodiments, the processor 200 may be configured to obtain the first query sub-information related to the first input information by extracting a keyword in the task result information and obtaining first query sub-information that matches the keyword in the task result information.

In some embodiments, the processor 200 may be configured to respond to the first input information and obtain the first feedback information by generating second query sub-information if a task cannot be generated based on analysis on the first input information, where the second query sub-information may instruct the user to provide target data needed for generating the task, and the second query sub-information may serve as the first feedback information. Correspondingly, the input circuit 100 may be further configured to collect second input information that responds to the second query sub-information. The processor 200 may be further configured to generate a second task according to the first input information and the second input information, and to perform the second task.

In some embodiments, the processor 200 may be configured to generate the second query sub-information by analyzing the first input information and obtaining a plurality of candidate results, where the candidate results may include all or some of task elements; and by respectively extracting key information of the plurality of candidate results and generating second query sub-information according to the extracted key information of the plurality of candidate results. The key information of the plurality of candidate results may be different, and key information of each candidate result may include a portion of information contained in the candidate result.

In some embodiments, the processor 200 may be configured to generate the second query sub-information according to the extracted key information of the plurality of candidate results, by arranging the key information of the plurality of candidate results in sequence to form the second query sub-information.

In some embodiments, the processor 200 may be configured to generate the second query sub-information according to the extracted key information of the plurality of candidate results, by arranging the key information of the plurality of candidate results in sequence, and respectively adding identifiers to the key information of the candidate results to form the second query sub-information.

In some embodiments, the processor 200 may be configured to generate the second task according to the first input information and the second input information by: extracting a keyword contained in the second input information; respectively matching the keyword contained in the second input information with the key information of the plurality of candidate results to determine a candidate result having the highest matching degree with the keyword contained in the second input information among the plurality of candidate results, and generating the second task according to the candidate result having the highest matching degree.

In some embodiments, the processor 200 may be configured to generate the second task according to the first input information and the second input information by: extracting a sequence keyword contained in the second input information; and determining a candidate result indicated by the sequence keyword among the plurality of candidate results, and generating the second task according to the candidate result indicated by the sequence keyword.

In some embodiments, the processor 200 may be configured to generate the second task according to the first input information and the second input information by: determining a first time point at which the second input information is received during playing of the voice information; and determining a candidate result corresponding to the first time point among the plurality of candidate results, and generating a second task according to the candidate result corresponding to the first time point.

For data processing processes by the processor 200 of the electronic device of the disclosure, reference can be made to corresponding descriptions of the above-described information processing methods.

The present disclosure provides an information processing method and an electronic device. The information processing method may include collecting first input information; obtaining first feedback information in response to the first input information, where the first feedback information may include query sub-information; and outputting the first feedback information, such that second input information that responds to the query sub-information can be collected. In the information processing method of the disclosure, a user can further supplement user need information or can propose a new service request according to the query sub-information, such that the electronic device can provide the user with relatively accurate and comprehensive services and can improve a user experience.

The relational term such as "first," "second," or the like is merely used to distinguish one entity or operation from another entity or operation, without necessarily requiring or implying that these entities or operations should have any of actual relation or sequence. Further, the term "comprising," "containing," "including," or the like is intended to cover a non-exclusive inclusion, such that a process, method, article, article, or apparatus not only may include those elements explicitly listed, but also may include other elements not explicitly listed and/or inherent elements of such process, method, article, or apparatus. Without additional constraints, an element defined by the wording "include an . . . " or similar expression does not exclude the existence of additional identical element(s) in a process, method, article, or apparatus that includes the defined element.

The embodiments of the present disclosure are described in a progressive manner, each of which is focused on the differences from other embodiments, and the same or similar portions of the various embodiments may be referenced to each other. For details of apparatus embodiments, reference can be made to descriptions of the method embodiments.

The foregoing description of the embodiments of the disclosure has been presented for purposes of illustration and description. It is not intended to be exhaustive or to limit the disclosure to the precise form or to example embodiments disclosed. Accordingly, the foregoing description should be regarded as illustrative rather than restrictive.

Obviously, many modifications and variations will be apparent to persons skilled in this art. The embodiments are chosen and described in order to explain the principles of the technology, with various modifications suitable to the particular use or implementation contemplated. It is intended that the scope of the invention be defined by the claims appended hereto in which all terms are meant in their broadest reasonable sense unless otherwise indicated. Therefore, the term "the disclosure," "the present disclosure," or the like does not necessarily limit the claim scope to a specific embodiment, and the reference to example embodiments of the disclosure does not imply a limitation on the invention, and no such limitation is to be inferred. Moreover, the claims may refer to "first," "second," etc., followed by a noun or element. Such terms should be understood as a nomenclature and should not be construed as giving the limitation on the number of the elements modified by such nomenclature unless specific number has been given. Any advantages and benefits described may or may not apply to all embodiments of the disclosure. It should be appreciated that variations may be made to the embodiments described by persons skilled in the art without departing from the scope of the present disclosure. Moreover, no element or component in the present disclosure is intended to be dedicated to the public regardless of whether the element or component is explicitly recited in the following claims.

What is claimed is:

1. A method for information processing comprising:
   collecting first input information;
   analyzing the first input information to obtain a plurality of pieces of key information;
   generating query sub-information containing the plurality of pieces of key information arranged in a sequence;
   obtaining feedback information in response to the first input information, the feedback information containing the query sub-information;
   outputting the feedback information by playing voice information converted from the feedback information;
   collecting second input information at a first time point during playing of the voice information; and
   determining one piece of key information from the plurality of pieces of key information as a user selection according to the first time point, the first time point corresponding to a second time point at which the one piece of key information is played.

2. The method according to claim 1, wherein obtaining the feedback information in response to the input information includes:
   analyzing the first input information to generate a task;
   performing the task to generate task result information; and
   generating the feedback information that contains the task result information and the query sub-information.

3. The method according to claim 1, wherein
   the query sub-information has a relevance to the input information that satisfies a preset requirement.

4. The method according to claim 1, wherein
   the query sub-information matches a keyword extracted from the input information.

5. The method according to claim 2, wherein
   the query sub-information matches a keyword extracted from the task result information.

6. The method according to claim 1, wherein:
   generating the query sub-information includes in response to no task being generated after analysis on the first input information, generating the query sub-information to instruct a user to provide target data needed for generating a task, the method further comprising
   generating the task according to the first input information and the second input information; and
   performing the task.

7. The method according to claim 6, wherein generating the query sub-information includes:
   analyzing the first input information to obtain a plurality of candidate results;
   extracting the plurality of pieces of key information corresponding to the plurality of candidate results; and
   generating the query sub-information according to the plurality of pieces of key information of the plurality of candidate results.

8. The method according to claim 7, wherein generating the task according to the first input information and the second input information includes:
   extracting a sequence keyword from the second input information; and
   determining a candidate result corresponding to the one of the plurality of pieces of key information indicated by the sequence keyword from the plurality of candidate results; and
   generating the task according to the candidate result.

9. The method according to claim 7, wherein generating the task according to the first input information and the second input information includes:
   determining, according to the second time point, a candidate result corresponding to the one of the plurality of pieces of key information from the plurality of candidate results; and
   generating the task according to the candidate result.

10. An electronic device comprising:
    an input circuit;
    a processor coupled to the input circuit; and
    an output circuit coupled to the processor,
    wherein the processor:
       receives first input information via the input circuit;
       analyzes the first input information to obtain a plurality of pieces of key information;
       generates query sub-information containing the plurality of pieces of key information arranged in a sequence; and
       obtains feedback information in response to the first input information, the feedback information containing the query sub-information;
       sends the feedback information via the output circuit to play voice information converted from the feedback information;
       collects, via the input circuit, second input information at a first time point during playing of the voice information; and
       determines one piece of key information from the plurality of pieces of key information as a user selection according to the first time point, the first time point corresponding to a second time point at which the one piece of key information is played.

11. The electronic device according to claim 10, wherein the processor obtains the feedback information in response to the input information by:
    analyzing the first input information to generate a task;
    performing the task to generate task result information; and
    generating the feedback information that contains the task result information and the query sub-information.

12. The electronic device according to claim 10, wherein the query sub-information has a relevance to the input information that satisfies a preset requirement.

13. The electronic device according to claim 10, wherein the query sub-information matches a keyword extracted from the input information.

14. The electronic device according to claim 10, wherein the input circuit is selected from the group consisting of a communication interface, a voice input, and a text input.

15. The electronic device according to claim 10, wherein:
the processor, in response to no task being generated after analysis on the first input information, generates the query sub-information to instruct a user to provide target data needed for generating a task, and
the processor further:
generates the task according to the first input information and the second input information; and
performs the task.

16. The electronic device according to claim 15, wherein the processor further generates the query sub-information by:
analyzing the first input information to obtain a plurality of candidate results;
extracting the plurality of pieces of key information corresponding to the plurality of candidate results; and
generating the query sub-information according to the plurality of pieces of key information of the plurality of candidate results.

17. The electronic device according to claim 16, wherein the processor further generates the task according to the first input information and the second input information by:
extracting a sequence keyword from the second input information; and
determining a candidate result corresponding to the one piece of key information indicated by the sequence keyword from the plurality of candidate results; and
generating the task according to the candidate result.

18. The electronic device according to claim 16, wherein the processor further generates the task according to the first input information and the second input information by:
determining, according to the second time point, a candidate result corresponding to the one piece of key information from the plurality of candidate results; and
generating the task according to the candidate result.

* * * * *